No. 720,137. PATENTED FEB. 10, 1903.
B. H. HARRIS.
MEANS FOR RAISING SUNKEN LOGS.
APPLICATION FILED JUNE 23, 1902.
NO MODEL.

Witnesses
Palmer A. Jones.
Jennie M. Sloane

Inventor
Bert H. Harris
By Luther V. Moulton
Attorney

UNITED STATES PATENT OFFICE.

BERT H. HARRIS, OF REED CITY, MICHIGAN.

MEANS FOR RAISING SUNKEN LOGS.

SPECIFICATION forming part of Letters Patent No. 720,137, dated February 10, 1903.

Application filed June 23, 1902. Serial No. 112,879. (No model.)

*To all whom it may concern:*

Be it known that I, BERT H. HARRIS, a citizen of the United States, residing at Reed City, in the county of Osceola and State of Michigan, have invented certain new and useful Improvements in Means for Raising Sunken Logs; and I do hereby declare the following to be a full, clear, and exact description of the invention, such as will enable others skilled in the art to which it appertains to make and use the same.

My invention relates to improvements in means for raising sunken logs; and its object is to provide the same with certain new and useful features hereinafter more fully described, and particularly pointed out in the claims, reference being had to the accompanying drawings, in which—

Figure 1:
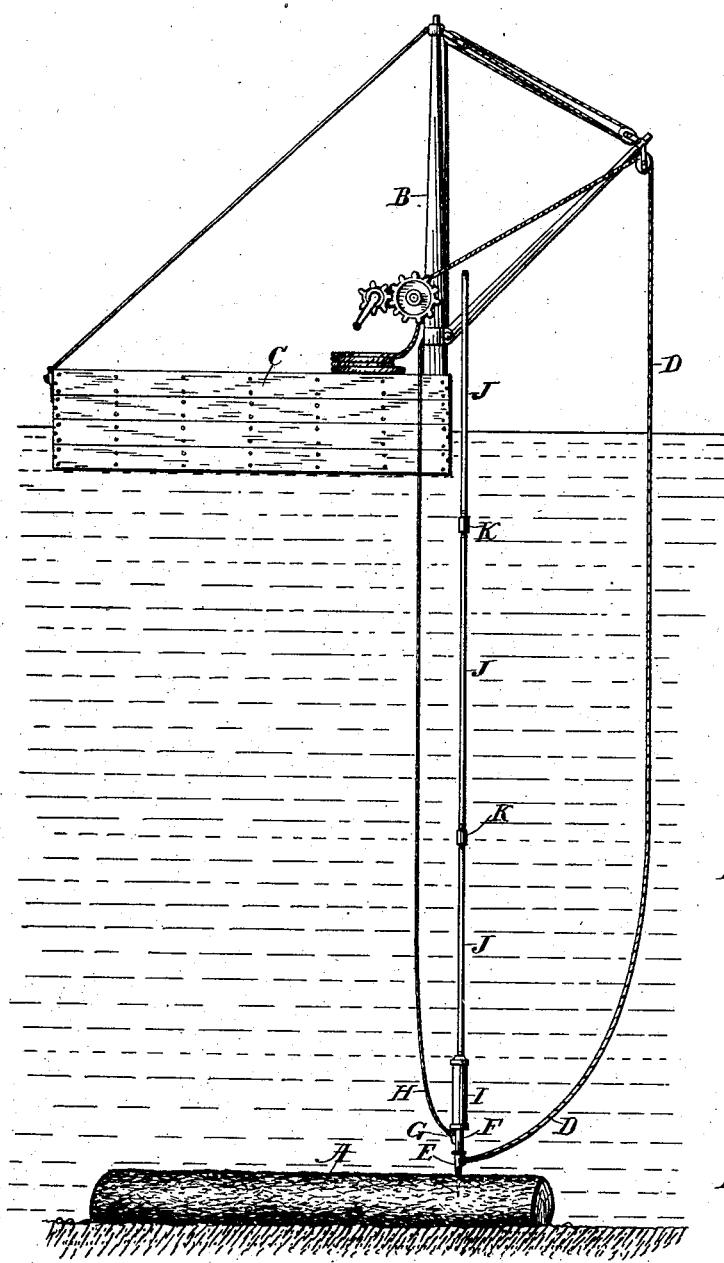
Figure 2:
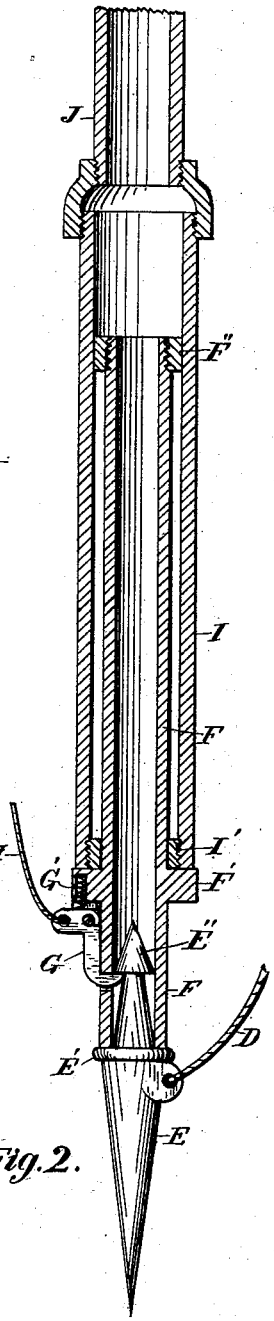

Figure 1 is an elevation of a device embodying my invention; and Fig. 2, an enlarged detail of the lower portion of the same, shown partially in vertical section.

Like letters refer to like parts in both figures.

A represents a sunken log with my device attached thereto; B, any suitable hoisting means, the device shown being a hoisting-crane; C, a suitable support for the same, that shown being a floating scow.

D is a hoisting-line attached to the crane and having attached to its lower end a dog E, adapted to be driven into the log to be raised, for which purpose it is provided with a suitable flange E', engaged by a suitable socket F, within which is a pointed and shouldered extension E'' on the dog. The shoulder of this extension is engaged by a suitable hook G to hold the dog detachably connected to the socket F. This hook is held in engagement with the shoulder on the dog by a spring G'. This hook is released by means of a cord H, extending upward to some suitable place near the crane B. The socket F is provided with a collar F', securely welded or otherwise attached thereto, and outside this socket and longitudinally movable thereon is a tube I to operate as a hammer to drive the dog E into the log. To permit the longitudinal movement of this tube I on the socket F and to prevent detachment of the socket therefrom, a ring I' is secured in the lower end of the tube I and another ring F'' is attached to the upper end of the socket and adapted to traverse the interior of the tube and to engage the ring I' to prevent detachment of the socket from the tube.

Attached to the upper end of the tube I by a suitable coupling is a handle J to operate the device. This handle is preferably of iron pipe and extensible by attaching additional sections by means of suitable couplings K.

From the foregoing description the operation of my device will be readily understood. The dog E is first driven into the log by repeated blows of the hammer I upon the flange F'. The dog is then released by pulling the cord H and the remainder of the device hoisted out of the way. The line D now being securely attached to the log, the same can be hoisted to the surface by means of the crane B and further disposed of in any convenient manner.

Instead of a crane B and scow C a boat can be used for manipulating the device for driving the dog into the log, and the line D may be led to the shore or to any other convenient point and the log moved thereby, as most convenient.

Having thus fully described my invention, what I claim, and desire to secure by Letters Patent, is—

1. The combination of a dog, a socket detachably connected thereto, a reciprocating hammer connected to the socket, a handle to operate the hammer, and a line attached to the dog.

2. The combination of a dog having a flange and a shouldered extension, a line attached to the dog, a socket to receive the extension and engaging flange, a hook on the socket to engage the shoulder, a cord to release the hook, a reciprocating hammer attached to the socket, and a handle to operate the hammer.

3. The combination of a dog, a socket detachably connected to the dog, a collar fixed on the socket, a tubular hammer surrounding the socket and longitudinally movable thereon, and a handle connected to the hammer to reciprocate the same.

4. The combination of a dog, a line attached to the dog, a reciprocating hammer detachably connected to the dog, and an extensible handle connected to the hammer to operate the same.

5. The combination of a dog, a tubular socket detachably connected to the dog, a collar fixed on the socket, a tubular hammer surrounding the socket and engaging the collar, a ring attached to the interior of the hammer and traversing the socket, and a ring attached to the socket and traversing the interior of the hammer, and a handle to operate the same.

6. The combination of a dog having a flange and a pointed and shouldered extension, a tubular socket engaging the flange and surrounding the extension, a pivoted hook, and a collar fixed on the socket, a ring within the hammer and traversing the socket, a ring on the socket traversing the interior of the hammer, a sectional handle to operate the hammer and couplings connecting the sections of the handle.

7. The combination of a suitable scow or float, a hoisting-crane mounted thereon, a line attached to the crane, a dog attached to the line, a reciprocating hammer detachably connected to the dog, a handle to operate the hammer, and a cord to detach the hammer from the dog.

8. The combination of a dog, a line attached to the dog, a hammer detachably connected to the dog, a handle to operate the hammer, and means for detaching the hammer and dog.

In testimony whereof I affix my signature in presence of two witnesses.

BERT H. HARRIS.

Witnesses:
L. K. PARKHURST,
STUART HAMMOND.